US010389728B2

(12) United States Patent
Dayka et al.

(10) Patent No.: US 10,389,728 B2
(45) Date of Patent: *Aug. 20, 2019

(54) MULTI-LEVEL SECURITY ENFORCEMENT UTILIZING DATA TYPING

(71) Applicant: INTERNATIONAL BUSINESS MACHINES CORPORATION, Armonk, NY (US)

(72) Inventors: John C. Dayka, New Paltz, NY (US); Michael Charles Osborne, Rueschlikon (CH); Tamas Visegrady, Rueschlikon (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,342

(22) Filed: Apr. 4, 2018

(65) Prior Publication Data

US 2018/0227310 A1    Aug. 9, 2018

Related U.S. Application Data

(63) Continuation of application No. 15/195,740, filed on Jun. 28, 2016, now Pat. No. 10,110,611, which is a
(Continued)

(51) Int. Cl.
*H04L 29/06* (2006.01)
*G06F 21/60* (2013.01)
(Continued)

(52) U.S. Cl.
CPC .......... *H04L 63/105* (2013.01); *G06F 21/602* (2013.01); *H04L 9/088* (2013.01);
(Continued)

(58) Field of Classification Search
CPC . H04L 63/105; H04L 63/123; H04L 63/0435; H04L 9/3247; H04L 9/088; G06F 21/71; G06F 2221/2113
See application file for complete search history.

(56) References Cited

U.S. PATENT DOCUMENTS 6,754,819 B1    6/2004  Wootten et al.
7,155,606 B1 *  12/2006 Smith ............... G06F 21/51
                                                    713/156
(Continued)

OTHER PUBLICATIONS

Keighren, Gavin, "Restricting Information Flow in Security APIs via Typing," Thesis, University of Edinburgh, 2014, 151 pages. Jan. 1, 2014.
(Continued)

*Primary Examiner* — Robert B Leung
(74) *Attorney, Agent, or Firm* — William Kinnaman; Matthew M. Hulihan; Heslin Rothenberg Farley & Mesiti PC

(57) ABSTRACT

A computer-implemented method, a computer system, and a computer program product are provided for enforcing multi-level security (MLS) on a message transmitted over a network that may be insecure. The method includes the processor obtaining a request from a source to send a message to a target, where the request includes the message and a context indicating a requested security level for the message. The processor encrypts the message based on ascertaining the message received in the request is a plaintext. The processor authenticates the encrypted message based on ascertaining the encrypted message is a ciphertext, where the target is enabled to trace the authenticated ciphertext back to the source. The processor transmits the authenticated encrypted message to the target across the network.

11 Claims, 7 Drawing Sheets

Related U.S. Application Data continuation of application No. 14/870,444, filed on Sep. 30, 2015, now Pat. No. 9,973,480.

(51) Int. Cl.
*H04L 9/32* (2006.01)
*H04L 9/08* (2006.01)
*G06F 21/71* (2013.01)

(52) U.S. Cl.
CPC ........ *H04L 9/3247* (2013.01); *H04L 63/0435* (2013.01); *H04L 63/0471* (2013.01); *H04L 63/06* (2013.01); *H04L 63/123* (2013.01); *G06F 21/71* (2013.01); *G06F 2221/2107* (2013.01); *G06F 2221/2113* (2013.01)

(56) References Cited

U.S. PATENT DOCUMENTS

| | | | |
|---|---|---|---|
| 7,603,548 B2 | 10/2009 | Patrick et al. | |
| 7,673,323 B1 | 3/2010 | Moriconi | |
| 8,041,947 B2 | 10/2011 | O'Brien et al. | |
| 2005/0010766 A1 | 1/2005 | Holden et al. | |
| 2006/0072748 A1* | 4/2006 | Buer | G06F 21/72 380/44 |
| 2006/0072762 A1* | 4/2006 | Buer | G06F 21/72 380/277 |
| 2006/0173845 A1 | 8/2006 | Handy-Bosma et al. | |
| 2008/0260147 A1 | 10/2008 | Shin et al. | |
| 2011/0113244 A1* | 5/2011 | Chou | H04L 63/166 713/168 |
| 2011/0314271 A1 | 12/2011 | Boccon-Gibod et al. | |
| 2012/0066509 A1 | 3/2012 | Lapp et al. | |
| 2012/0131354 A1 | 5/2012 | French | |
| 2012/0278820 A1* | 11/2012 | Dayka | G06F 21/53 719/328 |
| 2017/0093818 A1 | 3/2017 | Dayka et al. | |
| 2017/0093879 A1 | 3/2017 | Dayka et al. | |

OTHER PUBLICATIONS

Lanz, Daniel J., "High Assurance Cryptographic Interface," Military Communications Conference, 2008, MILCOM 2008, IEEE, pp. 1-5. Jan. 1, 2008.

Uchenick, Gordon M., et al., "Multiple Independent Levels of Safety and Security: High Assurance Architecture for MSLS/MLS," Military Communications Conference, 2005. MILCOM 2005, IEEE pp. 610-614. Jan. 1, 2005.

Mell, Peter, et al., "The NIST Definition of Cloud Computing", NIST Special Publication 800-145, Sep. 2011, Gaithersburg, MD, 7 pgs.

List of IBM Patents or Patent Applications Treated as Related, Apr. 4, 2018, pp. 1-2.

* cited by examiner

MULTI-LEVEL SECURITY ENFORCEMENT UTILIZING DATA TYPING

This application is a continuation of co-pending U.S. Ser. No. 15/195,740, entitled "MULTI-LEVEL SECURITY ENFORCEMENT UTILIZING DATA TYPING," filed Jun. 28, 2016, which itself is a continuation of U.S. patent application Ser. No. 14/870,444, entitled "MULTI-LEVEL SECURITY ENFORCEMENT UTILIZING DATA TYPING," filed Sep. 30, 2015, both of which are hereby incorporated herein by reference in their entirety.

BACKGROUND

One or more aspects relate, in general, to cryptography service for data communication, and, in particular, to additional cryptography service for conventional cryptography service functionality of mainframe computer systems.

Multi-level security (MLS) systems that are used in high-assurance environments as for financial transactions require privilege separation, reliable tracking of origins and purpose of cryptographic keys and data. Cryptography services provided in conventional mainframe computer systems lack the capability to tag information as required in MLS systems. Thus to implement MLS systems, cryptography service provider (CSP) need to associate types with inputs to the CSP prior to enforce type-based rules for MLS systems.

SUMMARY

Shortcomings of the prior art are overcome and additional advantages are provided through the provision of a computer-implemented method of enforcing multi-level security (MLS) on a message transmitted over a network that may be insecure. The method includes, for instance: obtaining, by a processor, a request from a source to send a message to a target, the request comprising the message and a context indicating a requested security level for the message; encrypting, by the processor, the message based on ascertaining the message received in the request is a plaintext; authenticating the encrypted message based on ascertaining the encrypted message is a ciphertext, wherein the target is enabled to trace the authenticated ciphertext back to the source; and transmitting, by the processor, the authenticated encrypted message to the target across the network.

Computer program products and/or computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a method for multi-level security (MLS) enforcement by use of datatyping is provided, as an added feature of conventional cryptography service provider (CSP) application programming interfaces (APIs), such that users of hardware-implemented conventional CSP APIs may utilize high-assurance cryptography service functionality without replacing physical computer systems.

In cryptography, a key is a variable value that is applied using an algorithm to a unit of unencrypted text to produce encrypted text, or to decrypt encrypted text. In this specification, any cryptographic function selected from the group including encryption, decryption, authentication, and verification is regarded to have a key corresponding to the cryptographic function. Mechanisms to secure keys for transportation are deemed to be provided by a conventional cryptography service provider (CSP).

Conventional CSP application programming interfaces (APIs) do not associate attributes with raw data, and generally offer basic key-usage attributes. As conventional CSP APIs provide limited key-transport capabilities, conventional CSP APIs are unable to securely transport key attributes, and consequently, unable to be employed in MLS environments, even if functions of the conventional CSP APIs could easily serve MLS systems. Thus a method to extend conventional CSP APIs capable of MLS service, as provided in aspects of the present invention, is beneficial.

An example of a CSP API, may be Public Key Cryptography Standards (PKCS) #11, which is one of the industry-accepted standards of cryptography service that is provided by RSA® Laboratories of RSA Security LLC. (RSA is a registered trademark of EMC Corporation, Hopkinton, Mass., USA.) PKCS #11 specifies an application programming interface (API) to devices, which hold cryptographic information and run cryptographic functions. Another example of a CSP API may be Secure IBM Enterprise Public Key Cryptography Standards (PKCS) #11 (EP11), which will be discussed in greater detail herein. (IBM® is a registered trademarks of International Business Machines Corporation, Armonk, N.Y., USA.)

One embodiment of the present invention may be implemented as an optional extension feature added to input/output (I/O) interface functionalities of a mainframe computer such as Secure IBM Enterprise Public Key Cryptography Standards (PKCS) #11 (EP11), provided as system calls for mainframe computers of a cryptography service. This embodiment enables data-typing to enforce MLS while retaining binary-compatibility for user-level applications running on the conventional PKCS functionality.

Figure 1A:
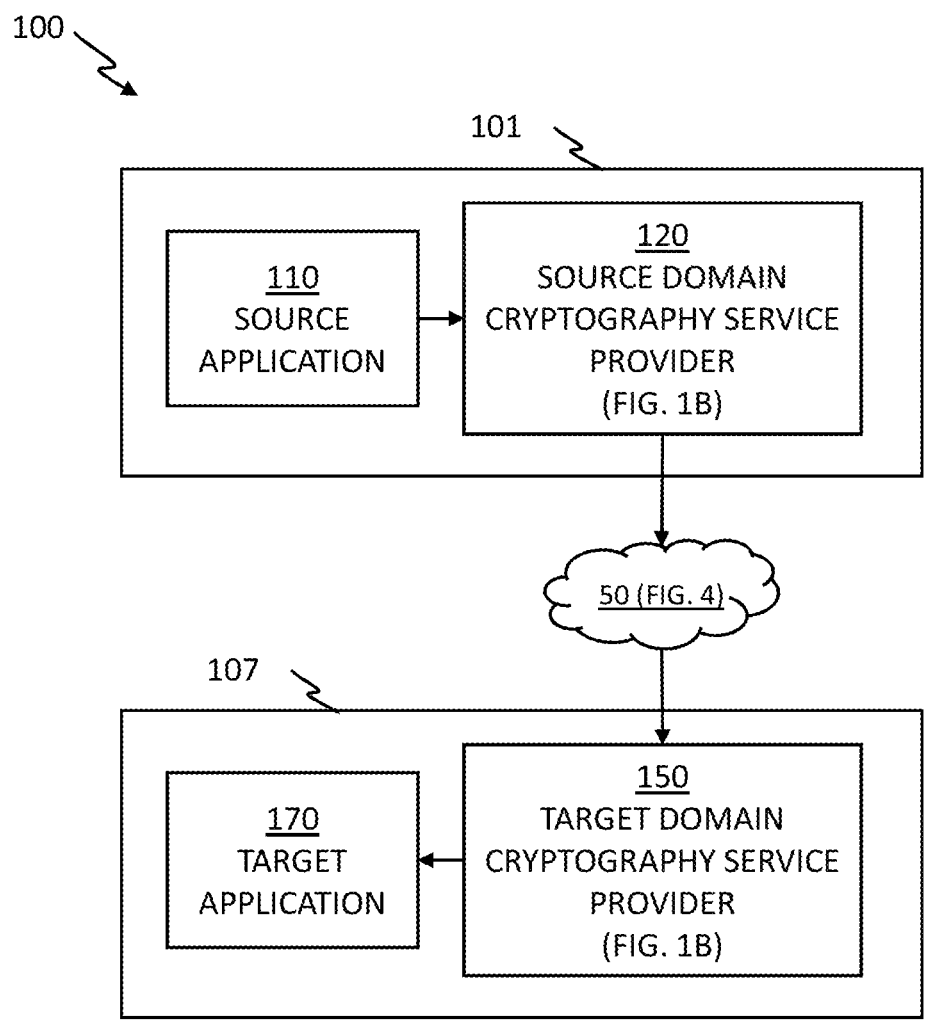
FIG. 1A depicts one embodiment of a system for enforcing multi-level security (MLS) by use of data typing.
Figure 1B:
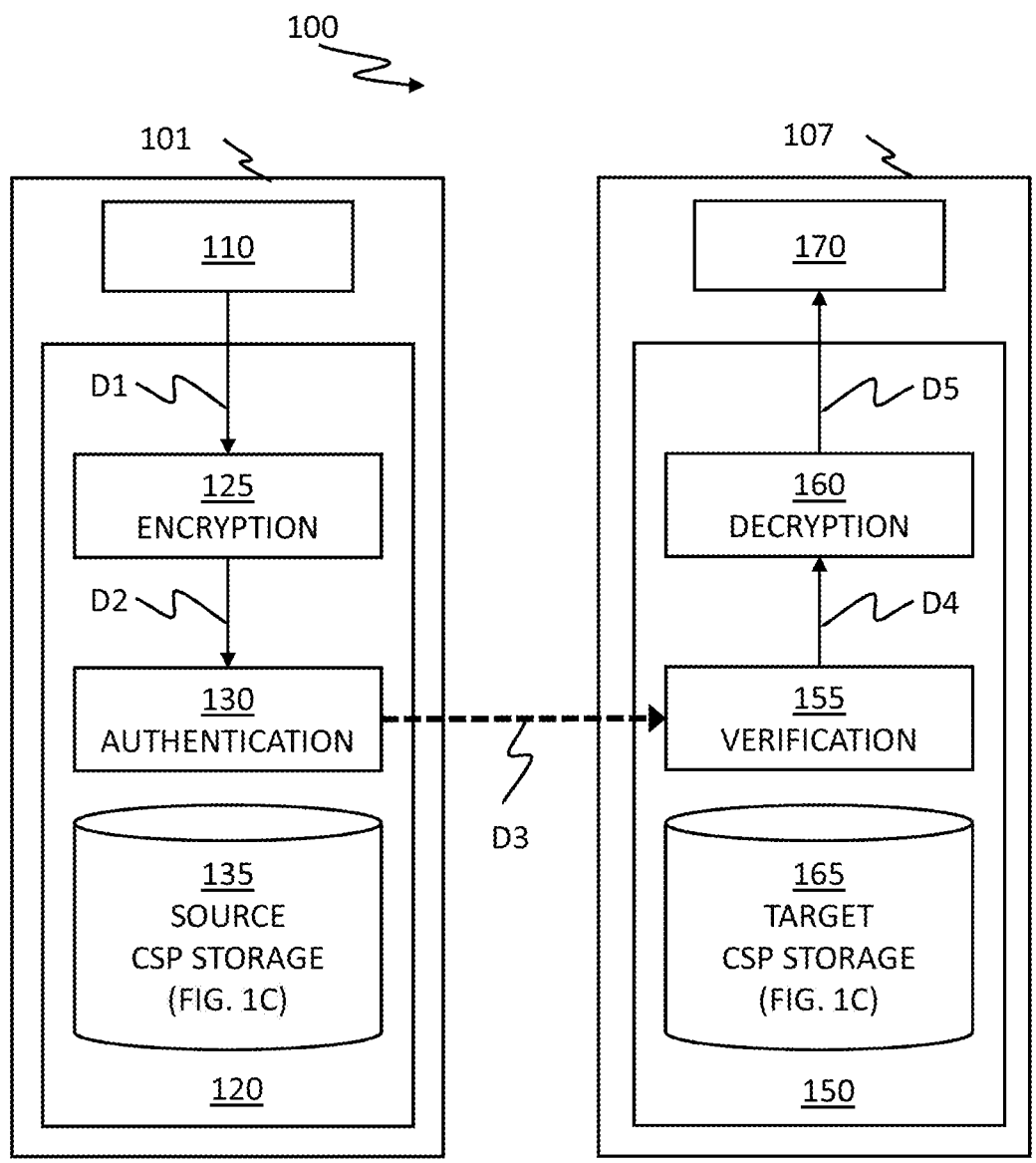
FIG. 1B depicts one embodiment of the system of FIG. 1A for enforcing multi-level security (MLS) by use of data typing, with components of cryptography service provider (CSP)

A PKCS #11 device stores objects and runs cryptographic functions, such as source domain computer system and target domain computer system as described in FIGS. 1A and 1B. Conventional PKCS #11 defines three types of objects consisting of a data object, a certificate object, and a key object. The data object is defined by an application. The certificate object stores a digital certificate. The key object stores a cryptographic key, or simply a key. Objects indicate items that are stored in a device, such as digital certificates and cryptographic keys. The key may be a public key, a private key, and/or a secret key. In some embodiments of the present invention, EP11 may use attribute-bound objects to secure the contents of a message.

As will be discussed in greater detail in this specification, EP11 is not a conventional CSP, even if it may emulate one. The EP11 differs from more conventional CSPs at least because it is stateless.

One embodiment of the present invention implements MLS-aware CSP mandate "attribute-bound" (AB) transport, because MLS functionality assumes that each object is associated with attributes during respective lifecycle of each object. Accordingly, in the same embodiment, an MLS environments would set up EP11 modules to enforce AB transport only and prohibit the use of PKCS#11 key transport. The AB key transport uses the same functions as to wrap or unwrap keys and associates keys with their attributes.

Data typing enables MLS as MLS-related attributes are directly attached to the corresponding data. The attribute field is in the clear and is authenticated as part of the enclosure of the message. As the EP11 platform of the present invention allows an expandable set of integer attributes, in one embodiment of the present invention, data types are represented integer attributes.

To regulate capabilities of keys, usage restrictions on data types may be embedded directly into EP11 code. Key attributes for MLS features, having either Booleans or integers values, may restrict the capability of MLS keys to act on certain data types. The CSP of the present invention may permit access to the message authentication code (MAC) keys authenticating data only to MLS-aware keys, such that non-MLS keys may not interfere with MLS traffic. Conversely, MLS operations may release data from typing, such that output of the MLS operations may be exported in non-MLS formats. Because the platform of the present invention EP11 permits runtime updates to attributes if required and properly configured, MLS enforcement rules may also be dynamically updated.

Because whether or not MLS is available may be easily determined by each key and because modules may unambiguously recognize key and data formats, MLS keys and sessions may coexist with corresponding non-MLS keys and sessions in a separate environment, wherein the MLS keys sessions and the corresponding non-MLS keys and sessions are hosted within the same CSP. Wherein the MLS capability and non-MLS capability are not concurrently used, a stateless CSP may be utilized to add usage restrictions exclusively for MLS and to prohibit usage of non-MLS objects. Also, wherein a CSP offers "control points" (CPs) to restrict choice of supported algorithms or key sizes, an MLS domain may enumerate CP profiles which designate a set of algorithms preferred by the MLS domain.

Referring now to FIG. 1A, one embodiment of a system 100 implementing a method for enforcing multi-level security (MLS) by use of data typing is shown. The system 100 comprises a source domain computer system 101, a target domain computer system 107, and a network 50.

The source domain computer system 101 comprises a source application 110 and a source domain cryptography service provider (CSP) 120. The target domain computer system 107 comprises a target application 170 and a target domain cryptography service provider (CSP) 150. The source domain computer system 101 is coupled to the target domain computer system 107 by use of the network 50, of FIG. 4. In this specification, the network 50 is regarded as an untrusted data communication medium, for which cryptography service to secure messages transmitted over the network is useful. The source application 110 sends a message (not shown) to the target application over the network, of which the path is represented by the directed arrows of FIG. 1A.

Referring now to FIG. 1B, one embodiment of the system 100 of FIG. 1A for enforcing multi-level security by use of data typing, with components of CSP, is shown. The source domain computer system 101 comprises the source application 110 and the source domain cryptographic service process (CSP) 120, and the target domain computer system 107 comprises the target domain CSP 150 and the target application 170, as shown in FIG. 1A.

The terms "source" and "target" in the source application 110, the source domain CSP 120, the target application 170, and the target domain CSP 150 are used to indicate a sender and a receiver of data, respectively. Accordingly, the terms "source/target" may be used interchangeably with terms "origin/destination," "sender/receiver," etc., respectively in the same order, to indicate respective roles in one instance of a data communication, and are not associated with an instance of physical entity such as a computer system. In one embodiment of the present invention, the source domain CSP 120 and the target domain CSP 150 are elements of input/output interface of IBM® Enterprise Public Key Cryptography Standards (PKCS) #11 (EP11) service.

One embodiment of the present invention provides an example of providing high-assurance data confidentiality and integrity based on conventional PKCS#11 Encrypt/Sign primitive system calls in order to prevent insecure combinations of encryption without adding machine-level cryptography services, relying on key-usage and data attributes. One embodiment of the present invention enables a functionality equivalent to authenticated encryption from separate encryption key and message authentication code (MAC) sign keys. In some embodiments of the present invention, Encrypt-then-MAC ordering is forced, that is, in these embodiments, program code encrypts a message, and subsequently signs the encrypted message. The Encrypt-then-MAC ordering may provide better security properties. Program code may enforce the Encrypt-then-MAC ordering restriction on operation order without changing any of semantics of Encrypt or Sign primitive system calls. In one embodiment of the present invention, the program code mat define additional data types and key-usage restriction corresponding to the additional data types to enforce the Encrypt-then-MAC ordering.

Figure 3:
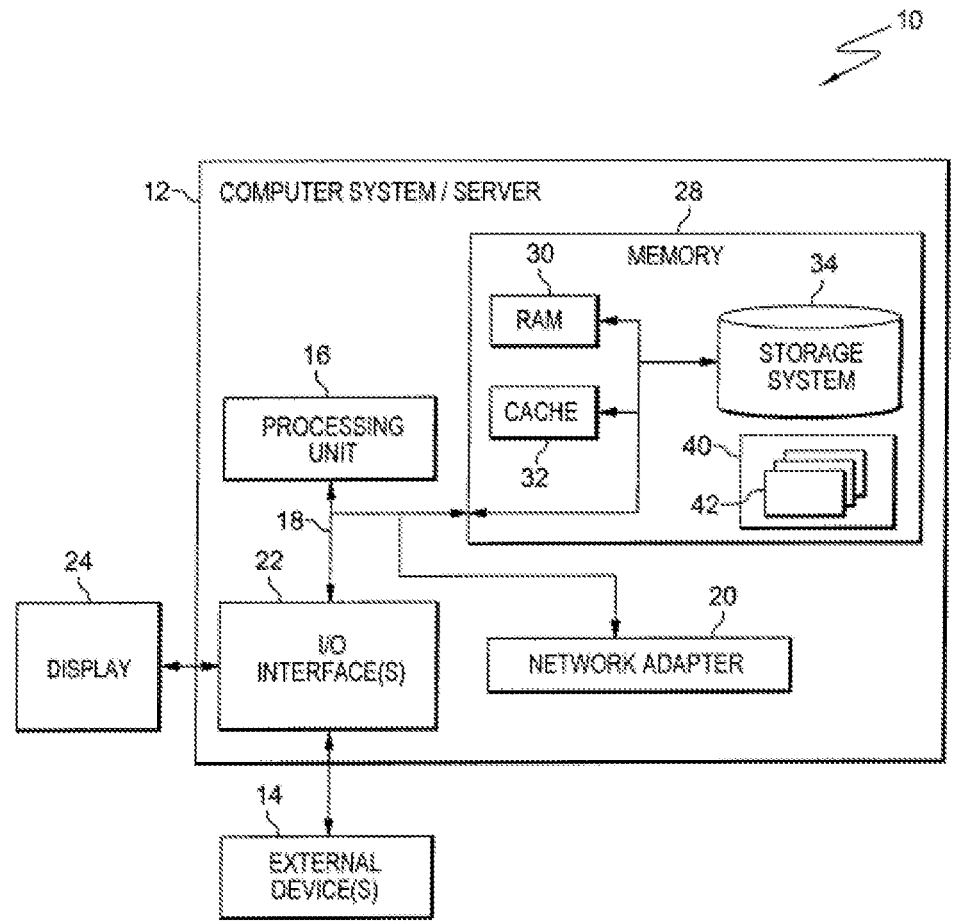
FIG. 3 depicts one embodiment of a cloud computing node.

In an embodiment of the present invention, the source application 110 and the source domain CSP 120 are implemented on a physical instance of a computer system 12 of FIG. 3 such that the source application 110 and the source CSP 120 communicate without any security concern. In one embodiment wherein the source application 110 and the source domain CSP 120 are implemented in a first instance of the computer system 12 of FIG. 3, the source application 110 is a first instance of program modules 42 of the first instance of the computer system 12 of FIG. 3, and the source domain CSP 120 is one element of input/output (I/O)

interface 22 of the first instance of the computer system 12 of FIG. 3. Similarly, the target application 170 and the target domain CSP 150 are may be implemented on another physical instance of the computer system 12 of FIG. 3. In one embodiment where the target application 170 and the target domain CSP 150 are implemented in a second instance of the computer system 12 of FIG. 3, the target application 170 is a second instance of program module 42 of the second instance of the computer system 12 of FIG. 3, and the target domain CSP 120 is one element of input/output (I/O) interface 22 of the second instance of the computer system 12 of FIG. 3. For ease of understanding, as shown in FIGS. 1A and 1B, the first instance of computer system hosting the source application 110 and the source domain CSP 120 is referred to as the source domain computer system 101, and the second instance of computer system hosting the target application 170 and the target domain CSP 150 is referred to as the target domain computer system 107.

In an embodiment of the present invention, the source application 110 generates a request to communicate securely with the target application 170, which is internally transferred to the source domain CSP 120, as shown in Arrow D1. The request comprises a command and an associated context, such as a wanted level of security for respective piece of data. Specifics of cryptography services such as details of synthesizing data-flow graphs to data types and key-usage restrictions need not to be disclosed to the source application 110 to generate the request. Within the source domain computer system 101, the source application 110 may securely communicate with the source domain CSP 120 via internal data communication channel without engaging the source domain CSP 120.

Although in certain embodiments of the present invention, a specific need not be exposed to applications directly, compositions may be compiled into datatype-based state machines similar to the above authenticated encryption example.

The source domain CSP 120 comprises an encryption module 125, an authentication module 130, and a source CSP storage 135. The source CSP storage 135 comprises key properties, system rules, and data properties for the encryption module 125 and the authentication module 130. As the source domain computer system 101 may function as the target domain computer system 107 in a bidirectional data communication, the source CSP storage 135 may further comprise respective key properties, system rules, and data properties for modules of the target domain CSP 150. In this specification, term "module" is used to indicate a programmed functionality to serve a specific purpose such as cryptography service, and does not indicate any specific program format whatsoever. Generally, program modules may include routines, programs, objects, components, logic, data structures, and so on that perform particular tasks or implement particular abstract data types.

Upon receiving the request from the source application 110, the source domain CSP 120, runs the encryption module 125, and runs the authentication module 130 with a result generated by the encryption module 125.

The encryption module 125 determines whether or not input is plaintext, or Type 1 Data as defined in this specification to indicate plaintext requesting the Encrypt-then-MAC encapsulation as generated by the source application 110. Arrow D1 indicates that the encryption module 125 only accepts Type 1 Data as input to encrypt as directed in the request. Wherein the input is plaintext, the encryption module 125 generates ciphertext corresponding to the input D1 by use of an encryption key, or Type 2 Data as defined in this specification to indicate ciphertext that is encrypted data without a MAC. Subsequently, the encryption module 125 provides the generated ciphertext to the authentication module 130, as shown in Arrow D2. See FIG. 1C for one example of properties of the encryption module 125 as described in the source CSP storage 135.

The authentication module 130 determines whether or not input is ciphertext, or Type 2 Data as defined in this specification to indicate ciphertext encrypted by the encryption module 125. Arrow D2 indicates that the authentication module 130 only accepts Type 2 Data as input to authenticate as directed in the request. Wherein the input is ciphertext, the authentication module 130 generates authenticated ciphertext corresponding to the input D2 by use of a MAC-signature key, or Type 3 Data as defined in this specification to indicate authenticated ciphertext, that is encrypted and then subsequently MACed data, prior to verification. Subsequently, the authentication module 130 transfers the authenticated ciphertext to the target domain CSP 150, as shown in Arrow D3. Type 3 Data is properly secured and may be safely released to untrusted intermediate networks. Arrow D3 is shown as a dashed line to indicate unsecured communication channel between the source domain computer system 101 and the target domain computer system 107. See FIG. 1C for one example of properties of the authentication module 130 as described in the source CSP storage 135. See FIG. 2 for various examples of security levels for data that may appear on the communication channel between the source domain computer system 101 and the target domain computer system 107, according to the level of security asked by the source application 110, as secured by the source domain CSP 120.

In an embodiment of the present invention, the target domain CSP 150 comprises a verification module 155, a decryption module 160, and a target CSP storage 165. The target CSP storage 165 comprises key properties, system rules, and data properties for the verification module 155 and the decryption module 160. As the target domain computer system 107 may function as the source domain computer system 101 in the bidirectional data communication, the target CSP storage 165 may further comprise respective key properties, system rules, and data properties for the modules of the source domain CSP 120.

Upon receiving the encrypted ciphertext from the source domain computer system 101 as generated by the authentication module 130, the target domain CSP 150 first runs the verification module 155, and subsequently runs the decryption module 160 with a result generated by the verification module 55.

The verification module 155 functions as a counterpart of the authentication module 125 of the source domain CSP 120. The verification module 155 determines whether or not input is authenticated ciphertext, or Type 3 Data as defined above. Arrow D3 indicates that the verification module 155 only accepts Type 3 Data as input to verify the input sent by the source domain CSP 120. Wherein the input is Type 3 Data, the authenticated ciphertext, the verification module 155 generates verified ciphertext corresponding to the input D3 by use of a MAC-verify key, or Type 4 Data as defined in this specification to indicate encrypted and MACed data, tagged as verified, as shown in Arrow D4. See FIG. 1C for one example of properties of the verification module 155 as described in the target CSP storage 165.

The decryption module 160 determines whether or not input from the verification module 155 is verified ciphertext, or Type 4 Data as defined above. Arrow D4 indicates that the decryption module 160 only accepts Type 4 Data as input to decrypt in generating output for the target application 170. Wherein the input is verified ciphertext, the decryption module 160 generates Type 5 Data, verified plaintext corresponding to the input D4 by use of a decryption key, by decrypting the verified ciphertext as retrieved from an approved Encrypt-then-MAC enclosure, as shown in Arrow D5. Subsequently, the target domain CSP 150 relays the generated Type 5 Data to the target application 170 via internal data communication channel within the target domain computer system 107, as shown in Arrow D5. See FIG. 1C for one example of properties of the decryption module 160 as described in the target CSP storage 165.

The target application 170 receives data securely communicated as sent by the request of the source application 110, from the target domain CSP 150, as shown in Arrow D5. The Type 5 Data (Arrow D5) received corresponds to the Type 1 Data (Arrow D1) sent by the source application 110.

By enforcing data type in each stage of the cryptography service provider (CSP), the system 100 enforces the Encrypt-then-MAC ordering. Rules governing participating keys may be enumerated as an accepted input format and a specified operation upon an input so accepted. See FIG. 1C for one example of keys, rules, and data attributes for various modules in one instance of a CSP storage.

The system 100 shows only one instance of unidirectional data transmission from the source application 110 to the target application 170. When the data communication is bidirectional, the target domain computer system 107 will function as the source domain computer system 101, and vice versa. Accordingly, to accommodate secure bidirectional data communication, a cryptographic service provider (CSP) element in I/O interface of a computer system performs functions comprising encryption, authentication, verification, and decryption.

The present method may be implemented as a hardware security module that may comprise a central processing unit (CPU) and a pre-processing unit dedicated to cryptography service provider (CSP), comprising the encryption module 125, the decryption module 160, the authentication module 130, the verification module 155, and an instance of the CSP storage 135, 165.

Figure 1C:
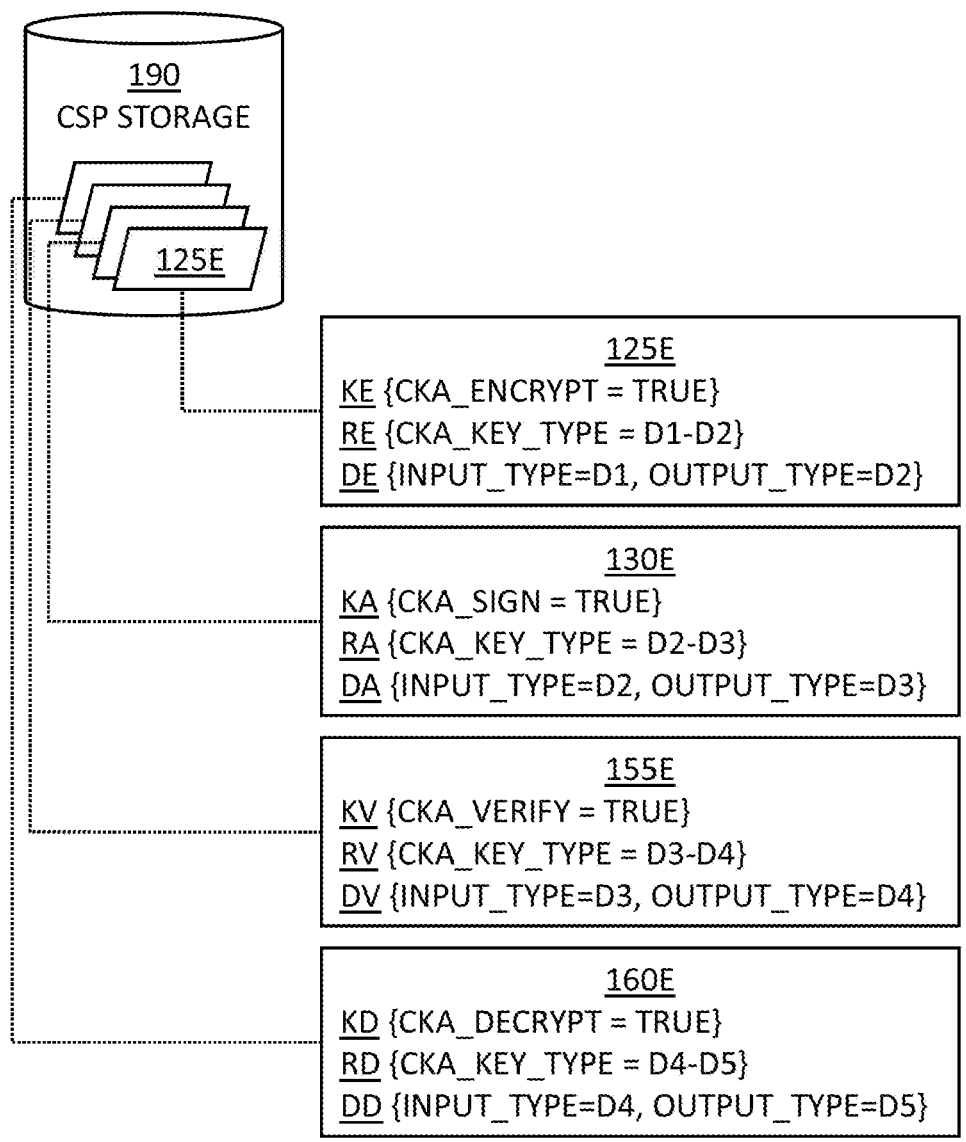
FIG. 1C depicts one embodiment of instances stored in a cryptography service provider (CSP) storage.

Referring now to FIG. 1C, one embodiment of a cryptographic service process (CSP) storage 190 for enforcing multi-level security by use of data typing is shown. The CSP storage 190 comprises instances of respective key properties, system rule, and data properties for the encryption module 125, the authentication module 130, the verification module 155, and the decryption module 160, of FIG. 1B, respectively, represented as 125E, 130E, 155E, and 160E, respectively.

MLS-assisting keys comprise restrictions on the accompanying data as to which operations may be performed on which data types. These restrictions of the MLS assisting keys may be described as usage-restrictions similar to existing EP11 attributes used as a platform for the present invention, to the extent that such MLS assisting keys restrictions may be added to EP11 while maintaining compatibilities with other client applications intended for EP11 typing. The MLS-aware functionality may mandate only that data used by to MLS keys is type-tagged, and that outputs of MLS functionality modules are type-tagged. Modules are able to derive the expected data type and/or attributes from an MLS-support key that is associated with respective modules.

In an embodiment of the present invention, the aforementioned tags may represent arbitrary attributes of everything, including, but not limited to, data fields. In implementing various embodiments of the present invention, the rules discussed, including but not limited to restricting keys' capabilities, may be matched against any request.

In an embodiment of the present invention, the described type-tagging is wire-visible (i.e., it is externally observable), it is in-band and therefore observable in request/response flows, and does not require auxiliary context and the tags are authenticated (e.g., integrity-protected, typically signed) and therefore immutable.

The type-tagging, which may be in-band and world-visible, as described above, enables entities, including those external to the described system, to follow the movement of data across prescribed state machines, without these entities requiring access to any other state. The type-tagging presents certain advantages in various embodiments of the present invention. First, immutable annotations, such as those employed in the described type-tagging of the present invention, can be critical for provenance-tracking. Second, in-band, public tags may be interpreted by simple stream-parsing components (assuming they can correlate wire-visible attributes with MLS restrictions/rules). Third, the de/serialization of a stateless CSP, as described in conjunction with certain aspects of the present invention, makes it possible to integrate such tagging without impacting existing code as it just changes the interpretation of fields. For example, for MLS-unaware code, the same fields could be used without annotations, thus, non/MLS application coexistence is possible.

Accordingly, MLS-enforcement rules may be defined as a combination of module-wide, partition-wide, or key-specific restrictions, which are assumed to be controlled by separate entities involved in an exchange of MLS-aware cryptography service. Where more than one restriction is applicable to one module/object, the strictest restriction that satisfies all applicable restrictions is applied as the effective MLS rule to enforce MLS functionalities according to the described rules.

Because the MLS-support capability of the present invention can be implemented by encoding the MLS capability within key objects and data fields, applications based on standard PKCS#11 are portable to an MLS-augmented EP11 backend in one embodiment of the present invention. Where the PKCS#11 applications do not violate MLS-implied rules, rely on system-provided defaults for some key attributes, and do not directly inspect raw data, the PKCS#11 applications may run on a computer system implementing the MLS-augmented EP11 without being affected by additional MLS-specific usage restrictions and data-attached fields.

MLS-related interactions may be described as disjoint data types, and a corresponding set of key types, as necessary based on data types, and the corresponding key-specific restrictions described by abstract descriptions such as human-readable specifications.

The present invention may be extended to further implementing MLS protocols into data types and key restrictions as an offline activity.

In one embodiment of the present invention, following key/type transformations rules are set as prior conditions of the example of FIG. 1C. First, where Type X data are permitted to be transformed into Type Y data, this transformation is explicitly enumerated in a rule, and noted by INPUT_TYPE and OUTPUT_TYPE attributes of data. Type X data, and Type Y data may be respectively selected from the group including Type 1 data (D1), Type 2 data (D2), Type 3 data (D3), Type 4 data (D4), and Type 5 data (D5), hereinafter. The key/type transformation rule may be implemented as a static feature that is embedded in program codes, or as a dynamic feature that is given during runtime. The transformation rule may further be abbreviated by using an attribute CKA_KEY_TYPE=X-Y, indicating that key type of Cryptographic Key Attribute, noted as CKA_KEY_TYPE, is for transforming Type X data to Type Y data. A valid pair of data types respective to all transformation rules shall be predefined regardless of implementation of the present invention such that a set of valid pairs for data transformation may be presented in the CSP storage 190, and such that the set of valid pairs are not to be influenced by actual objects to avoid inconsistency of the rules.

Second, MLS-capable CSPs in one embodiment of the present invention verify if object/key types and attributes are consistent with the enumerated rules for each CSP module. Wherein a cryptographic operation module may need a key to have a functional attribute corresponding to the cryptographic operation, as shown in descriptions of the encryption module 125, the authentication module 130, the verification module 155, and the decryption module 160 of FIG. 1B, and the MLS restrictions permit key/type transformations only if INPUT_TYPE and OUTPUT_TYPE are valid as shown in the set of valid pairs.

Third, symbolic names for attributes used in this example are consistent with PKCS#11 which is industry standard cryptographic service API. Finally, each MLS operation lists respective properties of a key associated with respective MLS operation to use, respective conditions to be set in the MLS-capable CSP, and respective data types/properties for each request. Only when all the prior conditions are satisfied, the MLS operation proceeds with performing respective functions described in modules 125, 130, 155, and 160 of FIG. 1B as noted above.

The CSP storage 190 represents exemplary attributes of the key/type evolution in implementing MLS-capable CSP. The example illustrates how the validity of each key/type transformation may be verified locally by each MLS operation, how to combine attributes pursuant to merging service requested, key-specific attributes, and MLS restrictions embedded into the backend:

One instance MLS restrictions for the encryption module 125E comprises key properties for encryption KE, system rule for encryption RE, and data properties for encryption DE. The key properties for encryption KE are represented as "CKA_ENCRYPT=TRUE" indicating that an encryption key is enabled to encrypt and that by applying the encryption key, the plaintext data is transformed into ciphertext. The system rule for encryption RE is represented as "CKA_KEY_TYPE=D1-D2" indicating that Type 1 data (D1) may be transformed into Type 2 data (D2) by the encryption key. The data properties for encryption DE is represented as "INPUT_TYPE=D1, OUTPUT_TYPE=D2" indicating that the encryption module takes plaintext tagged as Type 1/D1 as input and generates ciphertext tagged as Type 2/D2 that is corresponding to the input D1. Where an encryption-incapable keys, as represented by "CKA_ENCRYPT=FALSE," or type-transformation rules other than from D1 to D2, the encryption module does not proceed with encryption but returns to the source application, reporting error.

One instance MLS restrictions for the authentication module 130E comprises key properties for authentication KA, system rule for authentication RA, and data properties for authentication DA. The key properties for authentication KA are represented as "CKA_SIGN=TRUE" indicating that a MAC key is enabled to generate signatures, the ciphertext is transformed into signed ciphertext. The system rule for authentication RA is represented as "CKA_KEY_TYPE=D2-D3" indicating that Type 2 data (D2) may be transformed into Type 3 data (D3) by the authentication/MAC key. The data properties for authentication DA are represented as "INPUT_TYPE=D2, OUTPUT_TYPE=D3" indicating that the authentication module takes ciphertext tagged as Type 2/D2 as input and generates ciphertext that is subsequently signed/MACed, tagged as Type 3/D3 that is corresponding to the input D2. As Type 3/D3 data so generated is immune to modification, D3 data may be transmitted over unsecure communication channels, such as Internet.

Although represented in the CSP storage 190 together, the encryption instances and the authentication instances may act in concert for the source domain CSP 120 of FIG. 1B, and the verification instances and the decryption instances may act in concert for the target domain CSP 150 of FIG. 1B.

One instance MLS restrictions for the verification module 155E comprises key properties for verification KV, system rule for verification RV, and data properties for verification DV. The key properties for verification KV are represented as "CKA_VERIFY=TRUE" indicating that a verification key is enabled to verify the signature previously generated by the authentication module from the sender, and, as a result, transforms the signed ciphertext into verified ciphertext. The system rule for verification RV is represented as "CKA_KEY_TYPE=D3-D4" indicating that Type 3 data (D3) may be transformed into Type 4 data (D4) by the verification key. In this example, the verification key is symmetric to the MAC key that had been used to sign the ciphertext by the sender. The data properties for verification DV are represented as "INPUT_TYPE=D3, OUTPUT_TYPE=D4" indicating that the verification module takes signed ciphertext tagged as Type 3/D3 as input and generates verified ciphertext tagged as Type 4/D4 that is corresponding to the input D3. Verified ciphertext (Type 4/D4) assures integrity of data, indicating that the ciphertext had not been tempered during transmission over unsecured medium for D3. Although standard PKCS#11 Verify operation only returns a "pass/fail" Boolean result, the MLS-capable CSP of the present invention need to update the data tag, which necessitates pursuant changes to the CSP API.

One instance MLS restrictions for the decryption module 160E comprises key properties for decryption KD, system rule for decryption RD, and data properties for decryption DD. The key properties for decryption KD are represented as "CKA_DECRYPT=TRUE" indicating that a decryption key is enabled to decrypt a verified ciphertext input, and, as a result transforms the input into plaintext. The system rule for decryption RD is represented as "CKA_KEY_TYPE=D4-D5" indicating that Type 4 data (D4) may be transformed into Type 5 data (D5) by the decryption key. The data properties for decryption DD is represented as "INPUT_TYPE=D4, OUTPUT_TYPE=D5" indicating that the decryption module takes verified ciphertext tagged as Type 4/D4 as input and generates decrypted plaintext tagged as Type 5/D5 that is corresponding to the input D4. Once decrypted plaintext (D5) is generated, the target application 170 of FIG. 1B may verify that the data sent by the source application 110 of FIG. 1B had passed through the state/type transitions, from D1 through D5 as described above, to validate whether or not the Encrypt-then-MAC order was properly enforced.

Figure 2:
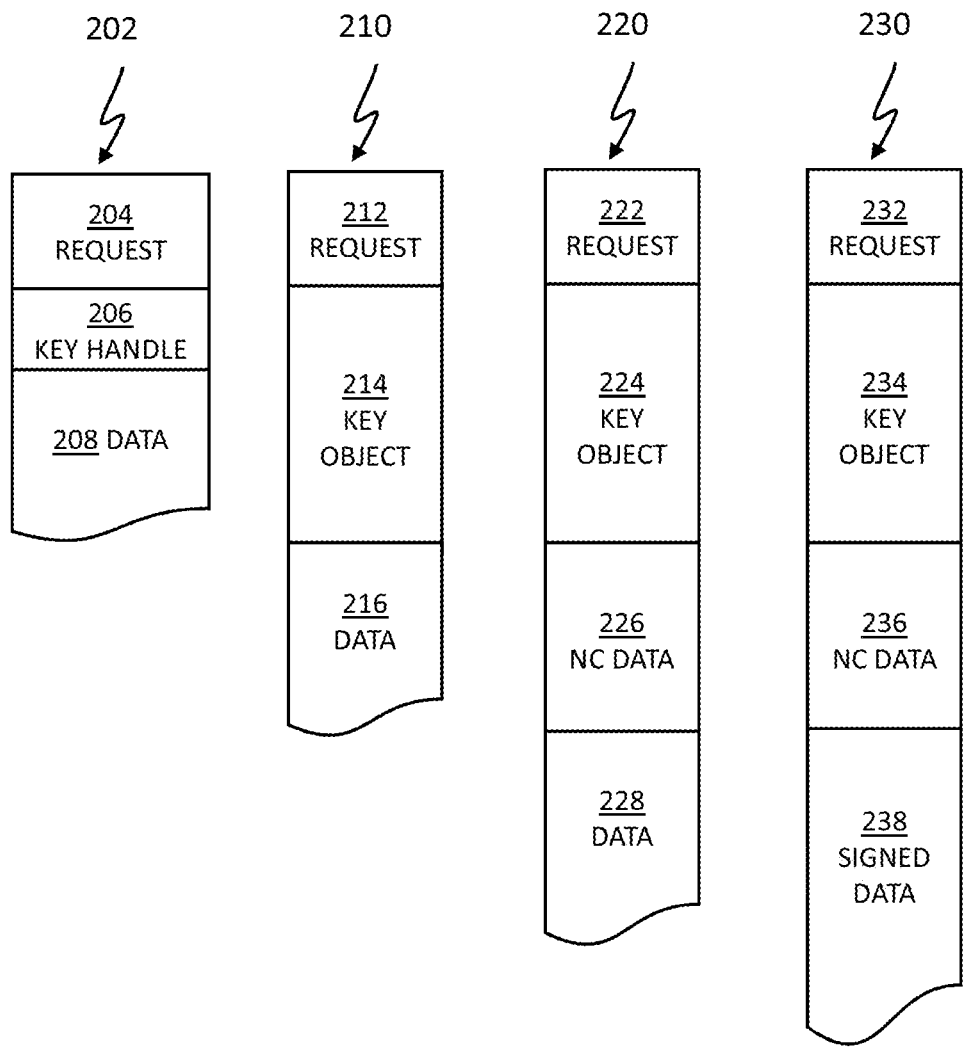
FIG. 2 depicts various structures of stateless CSP for MLS.

Referring now to FIG. 2, various security levels of Type 3 Data in stateless CSP for enforcing multi-level security by use of data typing are shown. Although providing industry-standard APIs such as state machine model of the PKCS#11 is preferable in other circumstances, a stateless CSP implementation suits better in enterprise environments in order to satisfy availability and scalability requirements, even for APIs which appear to be stateful for hosts. In one embodiment of the present invention, the IBM Enterprise PKCS#11 (EP11) implementation replaces standard PKCS#11 key tokens with in-band serialized key tokens such that the key tokens may be stored by host entities that are not trusted. Accordingly, the key tokens encrypt and subsequently authenticate numerous structures used by the stateless CSP, as presented in stateless CSP structures 202, 210, 220, and 230.

The stateless CSP implementation of aspects of the present invention can assist in enabling in-band, public tags to be interpreted by simple stream-parsing components. In contrast to stateless CSPs, type-tagging in stateful CSPs may contain other implied meaning, thus only partial information, such as handles may be wire-visible. This complicates the parsing and interpretation of the tags.

One embodiment of type enforcement described in FIGS. 1A, 1B, and 1C in the present specification is used to identify what security level a piece of data may belong to. Security levels as used in the context of term multi-level security (MLS) for cryptography service provider (CSP) comprise, no-security, integrity, and confidentiality. Data belonging to a no-security level are unsigned plaintexts. Data belonging to an integrity level have been authenticated in order to track back to the origin of the data, either plaintext or ciphertext. Data belonging to a confidentiality level are signed ciphertexts.

Structure 202 illustrates a first structure as used in conventional stateful CSP interface, comprising request 204, key handle 206, and data 208. The request 204 includes a command and a context in which the command of the request 204 may be performed. The request 204 may command a cryptographic operation to the stateful CSP. The request 204 belongs to no-security level. The key handle 206 is an indirect reference to module-resident keys that may appear in serialized PKCS#11 requests. The key handle 206 belongs to a no-security level. The data 208 of structure 202 is neither encrypted nor signed, and, accordingly, belongs to a no-security level.

Structure 210 illustrates a second structure used in stateless CSP interface with key-integrity enforcement. The structure 210 comprises request 212, key object 214, and data 216. The request 212 comprises a command and a context in which the command of the request 212 may be performed. The request 212 may command a cryptographic operation to the stateless CSP. The request 212 belongs to a no-security level. The key object 214 encodes MLS-specific additions and keys within the key object 214. The key object 214 is encrypted then signed, and belongs to a confidentiality level. The data 216 of structure 210 is neither encrypted nor signed, and, accordingly, belongs to no-security level.

Structure 220 illustrates a third structure as used in stateless CSP interface with key-integrity enforcement. The structure 220 comprises request 222, key object 224, non-confidential (NC) data 226 and data 228. The request 222 comprises a command and a context in which the command of the request 222 may be performed. The request 222 may command a cryptographic operation to the stateless CSP. The request 222 belongs to no-security level. The key object 224 encodes MLS-specific additions and keys within the key object 224. As the key object 224 is encrypted then signed, the key object 224 belongs to confidentiality level. The NC data 226 of structure 220 may be non-sensitive data/key such as a public key and corresponding attributes, and need not be encrypted but is signed to enable tracking of the origin of the non-confidential data 226. Accordingly, the NC data 226 belongs to an integrity level. The data 228 of structure 220 is neither encrypted nor signed, and, accordingly, belongs to a no-security level.

Structure 230 illustrates a fourth structure as used in stateless CSP interface with full-integrity enforcement, indicating that all components of the structure 230 may be tracked to the origin of respective components. The structure 230 comprises request 232, key object 234, non-confidential (NC) data 236 and signed data 238. The request 232 comprises a command and a context in which the command of the request 232 may be performed. The request 232 may command a cryptographic operation to the stateless CSP. The request 232 belongs to no-security level. The key object 234 encodes MLS-specific additions and keys within the key object 234. As the key object 234 is encrypted then signed, the key object 234 belongs to confidentiality level. The NC data 236 of structure 230 may be a public key and corresponding attributes, and need not be encrypted but need to be signed to enable tracking of the origin of the non-confidential data 236. Accordingly, the NC data 236 belongs to an integrity level. The signed data 238 of structure 238 is signed without encryption to enable tracking of the origin, and, accordingly, belongs to an integrity level.

Because stateless CSPs deserialize each request in its entirety, data fields may be treated as another hierarchically encoded type. Whether or not to recognize hierarchical data fields/raw data fields may be determined pursuant to context of the CSP operation, and consequently, the extension may preside concurrently with applications not expecting unselected treatment of data fields, as the CSP operation does not alter the message framing or headers but only makes different interpretation of data fields.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring again to FIG. 3:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
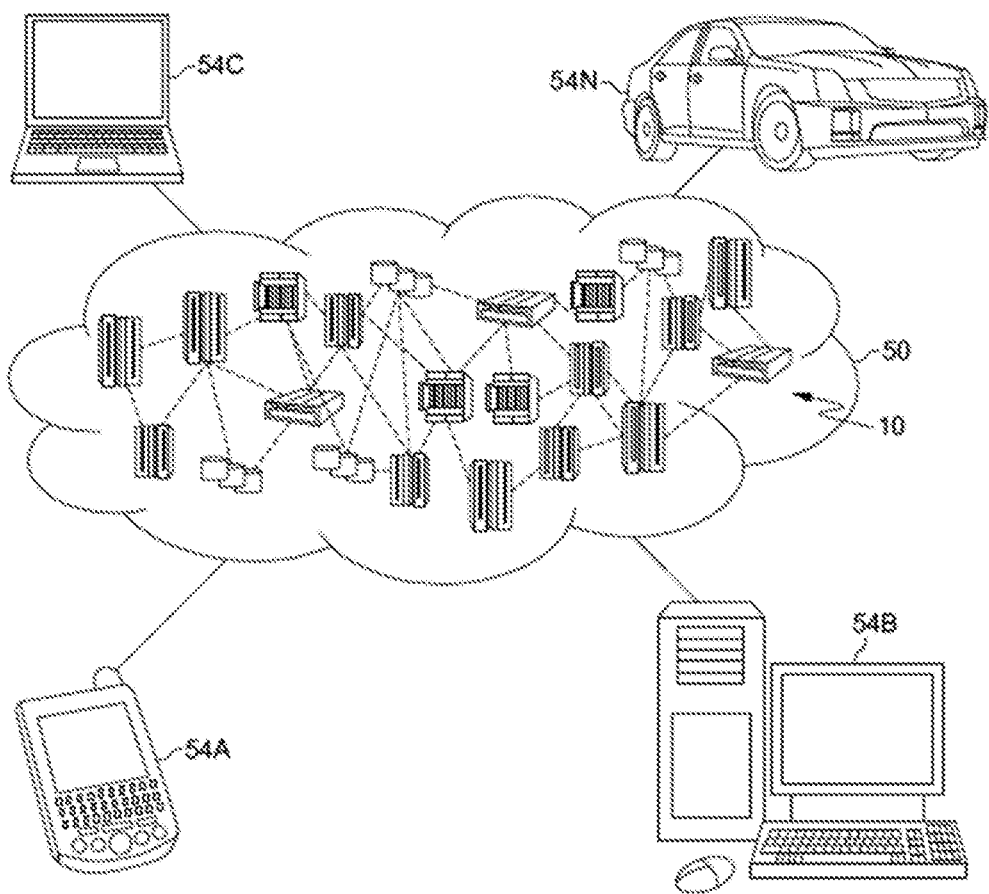
FIG. 4 depicts one embodiment of a cloud computing environment.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
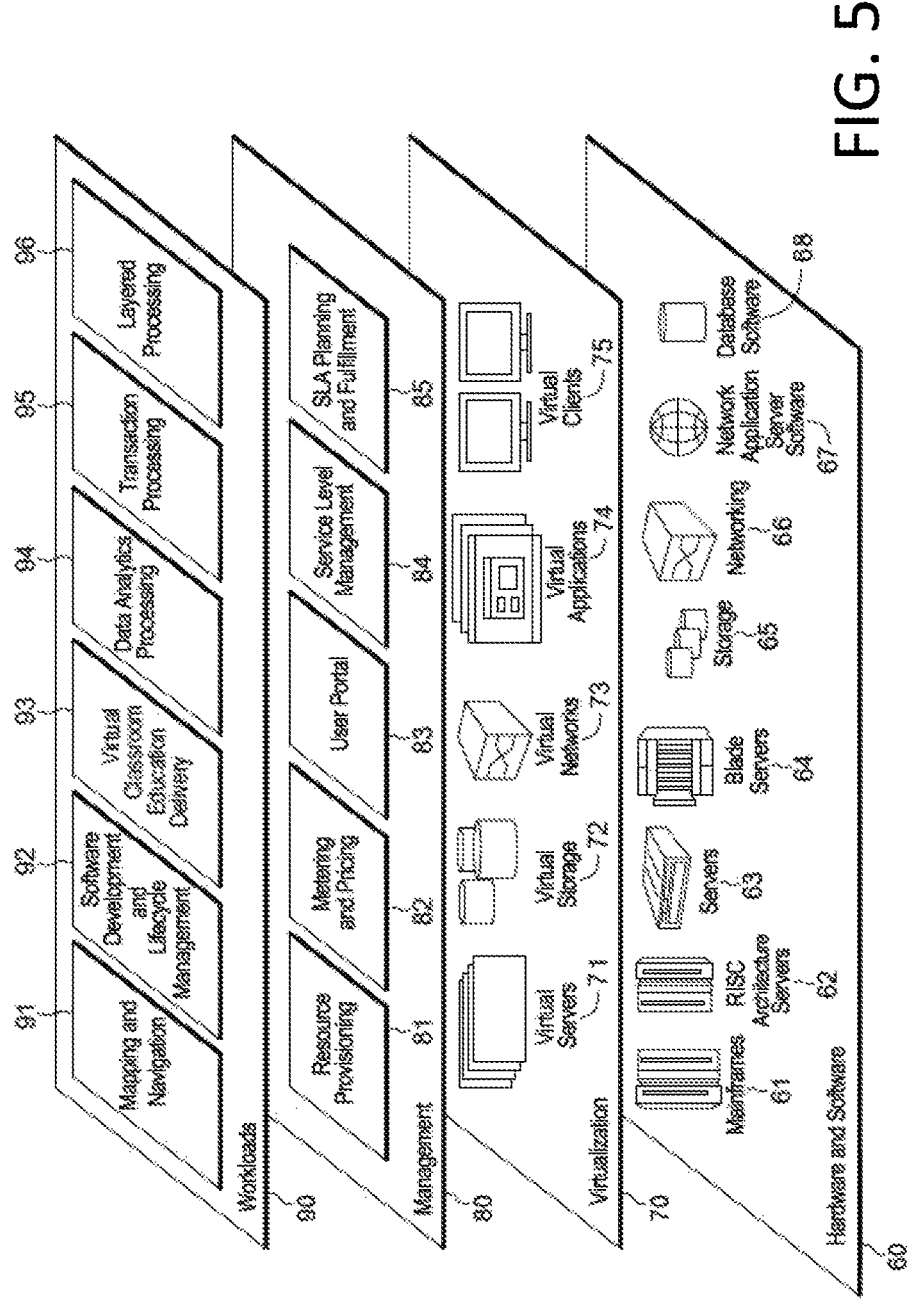
FIG. 5 depicts one example of abstraction model layers.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and layered processing 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of enforcing multi-level security (MLS) on a message transmitted over a network, comprising:
    obtaining, by a processor, a request from a source to send a message to a target, the request comprising the message and a context indicating a requested security level for the message;
    encrypting, by the processor, the message based on ascertaining the message received in the request is a plaintext;
    authenticating the encrypted message based on ascertaining the encrypted message is a ciphertext and using rule-based input and output data-type enforcement, and wherein the target is enabled to trace the authenticated ciphertext back to the source; and
    transmitting, by the processor, the authenticated encrypted message to the target across the network.

2. The computer-implemented method of claim 1, wherein the authenticated ciphertext is one or more of: wire-visible, in-band, or immutable based on being authenticated.

3. The computer-implemented method of claim 1, the encrypting comprising:
    acquiring a first key and a first rule corresponding to the first key for the encrypting, wherein the first rule comprises an attribute for encryption, an attribute for key type, and an attribute for data, wherein the first key enables the encrypting, wherein the attribute for key type is defined as an ordered set of a first data type and a second data type and instantiated as the plaintext for the first data type and the ciphertext for the second data type, indicating that the first key is applied to the plaintext and generates the ciphertext, and wherein the attribute for data is defined as a pair of data types for an input and an output of the encrypting, and wherein the input is instantiated as the plaintext, and the output is instantiated as the ciphertext, generated by the first key corresponding to the input;
    encoding the message by use of the first key pursuant to the first rule; and
    producing the ciphertext and making the produced ciphertext available to the authenticating.

4. The computer-implemented method of claim 1, further comprising:
    obtaining, by the processor, another message from the source;
    verifying, by the processor, the another message, based on ascertaining the another message is a signed ciphertext;
    decrypting, by the processor, the verified another message from the verifying based on ascertaining that the verified another message is a verified ciphertext, such that a module generates a verified plaintext corresponding to the message from the source; and
    delivering the verified plaintext to the target.

5. The computer-implemented method of claim 4, the verifying comprising:
    acquiring a first key and a first rule corresponding to the first key for the verifying, wherein the first rule comprises an attribute for verification, an attribute for key type, and an attribute for data, wherein the first key enables the verifying, wherein the attribute for key type is defined as an ordered set of a first data type and a second data type and instantiated as the signed ciphertext for the first data type and the verified ciphertext for the second data type, indicating that the first key is applied to the signed ciphertext of the another message and generates the verified ciphertext, and wherein the attribute for data is defined as a pair of data types for an input and an output of the verifying, and wherein the input is instantiated as the signed ciphertext, and the output is instantiated as the verified ciphertext corresponding to the input;
    assuring that the source had sent the another message based on the first key pursuant to the first rule; and
    producing the verified ciphertext and making the produced verified ciphertext available to the decrypting.

6. The computer-implemented method of claim 4, the decrypting comprising:
    acquiring a first key and a first rule corresponding to the first key for the decrypting, wherein the first rule comprising an attribute for decryption, an attribute for key type, and an attribute for data, wherein the first key enables the decrypting, wherein the attribute for key type is defined as an ordered set of a first data type and a second data type and instantiated as the verified ciphertext for the first data type and the verified plaintext for the second data type, indicating that the first key is applied to the verified ciphertext of the another message and generates the verified plaintext, and wherein the attribute for data is defined as a pair of data types for an input and an output of the decrypting, and wherein the input is instantiated as the verified ciphertext, and the output is instantiated as the verified plaintext corresponding to the input;
    decoding the verified ciphertext of the another message based on the first key pursuant to the first rule; and
    producing the verified plaintext and making the produced verified plaintext available to the delivering.

7. The computer-implemented method of claim 1, wherein the request from the source is a request from a source application of a source domain computer system, wherein a cryptographic service process (CSP) of the source computer system obtains the request from the source application, invokes an encryption module of the CSP to perform the encrypting the message, invokes an authentication module of the CSP to perform the authenticating the encrypted message, and wherein the authentication module performs the transferring to a target domain computer system.

8. The computer-implemented method of claim 7, wherein the CSP is an element in an I/O interface of the source domain computer system.

9. The computer-implemented method of claim 7, wherein the source domain computer system comprises a hardware security module having a central processing unit and a per-processing unit dedicated to the CSP and having the encryption module, the authentication module, a decryption module, a verification module, and a storage instance for the CSP.

10. The computer-implemented method of claim 7, wherein the CSP is a stateless CSP.

11. The method of claim 1, wherein the rule-based input and output data-type enforcement correlates keys with corresponding rules that control use of those keys in cryptographic functions based on data types.

* * * * *